(12) United States Patent
Burns

(10) Patent No.: US 8,951,181 B2
(45) Date of Patent: Feb. 10, 2015

(54) SOUND ABATING HEAT SINK AND MOTOR HOUSING

(75) Inventor: Jeffrey H. Burns, Carmel, IN (US)

(73) Assignee: Beckman Coulter, Inc., Brea, CA (US)

( * ) Notice: Subject to any disclaimer, the term of this patent is extended or adjusted under 35 U.S.C. 154(b) by 1155 days.

(21) Appl. No.: 12/895,204

(22) Filed: Sep. 30, 2010

(65) Prior Publication Data

US 2011/0082021 A1  Apr. 7, 2011

Related U.S. Application Data

(60) Provisional application No. 61/247,842, filed on Oct. 1, 2009.

(51) Int. Cl.
| | | |
|---|---|---|
| *B04B 15/02* | (2006.01) | |
| *B04B 9/02* | (2006.01) | |
| *H02K 5/18* | (2006.01) | |
| *H02K 5/24* | (2006.01) | |

(52) U.S. Cl.
CPC .. *B04B 9/02* (2013.01); *H02K 5/18* (2013.01); *H02K 5/24* (2013.01)
USPC ............................... 494/14; 165/146; 310/64

(58) Field of Classification Search
CPC ................................. B04B 15/02; H02K 5/18
USPC ......... 494/14, 16; 165/135, 146, 185; 310/64, 310/89
See application file for complete search history.

(56) References Cited

U.S. PATENT DOCUMENTS

| | | | |
|---|---|---|---|
| 2,827,229 A | | 3/1958 | Blum |
| 4,541,736 A | | 9/1985 | Giebeler, Jr. |
| 4,606,305 A | | 8/1986 | Campen |
| 5,008,575 A | * | 4/1991 | Ishimoto et al. ................ 310/89 |
| 5,538,113 A | | 7/1996 | White et al. |
| 5,683,341 A | * | 11/1997 | Giebeler ......................... 494/16 |

(Continued)

FOREIGN PATENT DOCUMENTS

| | | |
|---|---|---|
| CH | 289502 | 3/1958 |
| CN | 1495889 A | 5/2004 |

(Continued)

OTHER PUBLICATIONS

International Search Report and Written Opinion mailed Feb. 13, 2012.

(Continued)

*Primary Examiner* — Charles Cooley
*Assistant Examiner* — Marc C Howell
(74) *Attorney, Agent, or Firm* — Merchant & Gould P.C.

(57) ABSTRACT

A centrifuge includes a rotor configured to receive sample containers; a drive shaft operatively coupled to the rotor; and a motor. The motor includes a housing; a plurality of substantially parallel fins integral with the housing, each fin having a free end spaced from the housing, wherein the free ends of the plurality of fins are disposed in a common cylindrical plane; and a plurality of substantially parallel grooves, each groove disposed between a pair of adjacent fins and having a groove depth defined by a distance between the common cylindrical plane and the housing. Wherein the plurality of grooves includes a first multitude of grooves having a common groove depth and a second multitude of grooves having a groove depth that is not the same as the common groove depth, wherein the first and second multitude of grooves are interleaved.

15 Claims, 7 Drawing Sheets

(56) References Cited

U.S. PATENT DOCUMENTS

| | | |
|---|---|---|
| 5,952,751 A | 9/1999 | Yamakoshi et al. |
| 6,011,335 A * | 1/2000 | Belley ............................ 310/89 |
| 6,631,756 B1 * | 10/2003 | Hegde .......................... 165/80.3 |
| 7,019,424 B2 | 3/2006 | Aeschlimann et al. |
| 7,333,332 B2 | 2/2008 | Wang |
| 2006/0254750 A1 | 11/2006 | Miyazawa |
| 2007/0227711 A1 | 10/2007 | Furuya |
| 2008/0123270 A1 | 5/2008 | Kim et al. |

FOREIGN PATENT DOCUMENTS

| | | |
|---|---|---|
| JP | 54-167305 | 11/1979 |
| JP | 55-43386 | 3/1980 |
| JP | 60-35934 | 2/1985 |
| JP | 63-090955 U | 6/1988 |
| JP | 02-012457 U | 1/1990 |
| JP | 05-111211 | 4/1993 |
| JP | 8-80009 | 3/1996 |
| JP | 11-178281 | 2/1999 |
| JP | 2000-102216 | 4/2000 |
| SU | 736274 | 5/1980 |
| WO | 97/27662 A1 | 7/1997 |
| WO | WO 97/44882 | 11/1997 |

OTHER PUBLICATIONS

Beckman Coulter, *Housing, Drive*, Mar. 30, 2007, 1pg.
Beckman Coulter, *Housing, Drive—Oil Reservoir*, Mar. 30, 2007, 1pg.
Beckman Coulter, *Drive Motor Assembly*, Jul. 16, 2007, 1pg.
State Intellectual Property Office of the People's Republic of China, The Second Office Action for Application No. 201080044026.6, mailed on Aug. 4, 2014, 12 pages.
JP Official Action (JP2012-532319) dated Jul. 23, 2014 (5 pages).

\* cited by examiner

SOUND ABATING HEAT SINK AND MOTOR HOUSING

CROSS REFERENCE TO RELATED APPLICATION

This application claims the benefit of U.S. Provisional Application No. 61/247,842 filed Oct. 1, 2009, and is entirely incorporated by reference herein.

FIELD OF INVENTION

The present disclosure is generally directed to a heat sink including a plurality of cooling fins and, more particularly, to a heat sink with cooling fins arranged and configured to abate sound generated from vibrations transferred to the cooling fins.

BACKGROUND

Conventional heat sinks are arranged and configured to include a base plate and a plurality of cooling fins extending from the base plate and spaced apart by a plurality of grooves. During use, the base plate disperses heat generated by an electronic device, a motor, or any other system, and air is blown through the grooves over the cooling fins. Typically, each of the cooling fins and grooves are uniform in size and designed to optimize cooling for any given application. In certain applications, however, vibrations generated by the system can transfer to the cooling fins and generate an unpleasant sound.

In one known application of a heat sink, a centrifuge includes a rotor and a variable speed electric motor adapted to drive the rotor via a drive shaft. The motor includes a motor housing that includes a generally cylindrical member constructed of aluminum, and which contains the stator and winding coils of the motor. During use, the motor generates heat and therefore the motor housing serves as a heat sink and is equipped with a plurality of cooling fins, across which air is blown to cool the system. The fins are of generally uniform dimension and are separated by grooves of generally uniform dimension. Such a design effectively cools the motor, but can generate an unpleasant sound at certain speeds. This is due to the fact that all of the fins are the same size and shape, and therefore, they all share a common resonant, fundamental, and/or harmonic frequency. More specifically, at certain speeds the vibrations in the system simultaneously excite the fundamental, resonant, and/or harmonic frequencies of the fins, and this produces aloud unpleasant sound. Testing has illustrated that when the motor of the above-described centrifuge accelerates and decelerates near a speed of approximately 83,000 RPM, a high pitch whine is produced. This whine is also produced at steady state operation near 83,000 RPM, but with slightly less magnitude.

SUMMARY

One aspect of the present disclosure provides a centrifuge including a rotor configured to receive sample containers; a drive shaft operatively coupled to the rotor; and a motor operatively coupled to the drive shaft to rotate the drive shaft and the rotor during a centrifugal operation. The motor includes: (i) a housing; (ii) a plurality of substantially parallel fins integral with the housing, each fin having a free end spaced from the housing, wherein the free ends of the plurality of fins are disposed in a common cylindrical plane; and (iii) a plurality of substantially parallel grooves, each groove disposed between a pair of adjacent fins and having a groove depth defined by a distance between the common cylindrical plane and the housing. The plurality of grooves includes a first multitude of grooves having a common groove depth and a second multitude of grooves having a groove depth that is not the same as the common groove depth, wherein the first and second multitude of grooves are interleaved.

In some aspects, at east two of the second multitude of grooves have a different groove depth.

In some aspects, each of the second multitude of grooves have a different groove depth.

In some aspects, every other groove has the common groove depth.

In some aspects, the common groove depth is greater than the groove depth of each of the second multitude of grooves.

Another aspect of the present disclosure provides a centrifuge with a rotor configured to receive sample containers; a drive shaft operatively coupled to the rotor; and a motor operatively coupled to the drive shaft to rotate the drive shaft and the rotor during a centrifugal operation. The motor includes: (i) a housing; (ii) a plurality of substantially parallel fins integral with the housing, each fin having a free end spaced from the housing, wherein the free ends of the plurality of fins are disposed in a common cylindrical plane; and (iii) a plurality of substantially parallel grooves, each groove disposed between a pair of adjacent fins and having a groove depth defined by a distance between the common cylindrical plane and the housing. Each groove has a groove depth that is different than the groove depth of an adjacent groove.

In some aspects, the groove depth of at least three of the plurality of grooves are different.

In some aspects, the depth of the different groove depths are randomly selected.

In some aspects, at least two of the groove depths are the same.

In some aspects, at least two of the groove depths are different, wherein the grooves having the same groove depth and the grooves having different groove depths are interleaved.

In some aspects, the grooves having the same groove depth are every other groove.

In some aspects, each of the plurality of fins has a fin thickness and wherein at least two of the fins have a fin thickness that is not the same.

Another aspect of the present disclosure provides a centrifuge. The centrifuge includes a rotor configured to receive sample containers; a drive shaft operatively coupled to the rotor; and a motor operatively coupled to the drive shaft to rotate the drive shaft and the rotor during a centrifugal operation, wherein the motor comprises a housing and a plurality of substantially parallel fins extending from the housing. The housing includes a body portion and a plurality of protrusions integral with the body portion, the plurality of protrusions disposed between pairs of adjacent fins, each protrusion having a radial dimension defined by a distance that the protrusion extends away from the body portion. Each protrusion has a radial dimension that is not the same as the radial dimension of an adjacent protrusion.

In some aspects, each of the plurality of protrusions has a different radial dimension.

In some aspects, the protrusions of different radial dimension are randomly distributed along the housing.

In some aspects, the plurality of protrusions are disposed in a regular period between pairs of adjacent fins.

In some aspects, the plurality of protrusions are disposed between every other pair of adjacent fins.

In some aspects, each of the plurality of fins has a free end spaced from the housing, wherein the free ends of the plurality of fins are disposed in a common cylindrical plane.

In some aspects, wherein the plurality of protrusions comprises a first, second, and third consecutive protrusion, wherein the second consecutive protrusion is between the first and third consecutive protrusions, wherein the radial dimension of the second consecutive protrusion is greater than the radial dimensions of the first and third consecutive protrusions.

In some aspects, the plurality of protrusions comprises a first, second, and third consecutive protrusion, wherein the second consecutive protrusion is between the first and third consecutive protrusions, wherein the radial dimension of the second consecutive protrusion is less than the radial dimensions of the first and third consecutive protrusions.

DETAILED DESCRIPTION

Figure 1:
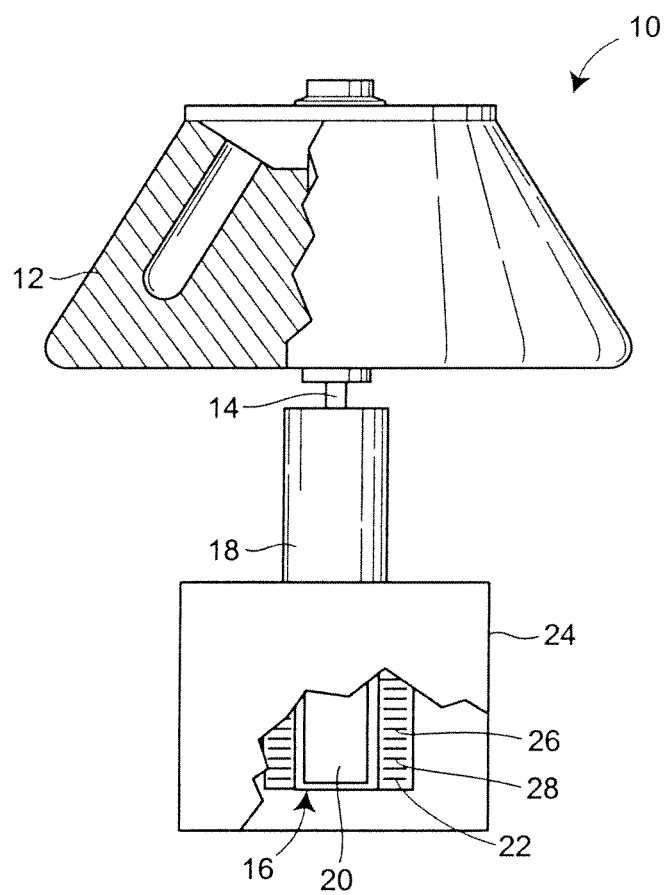
FIG. 1 is a partially broken away side view of a centrifuge constructed in accordance with the principles of the present disclosure.
Figure 2:
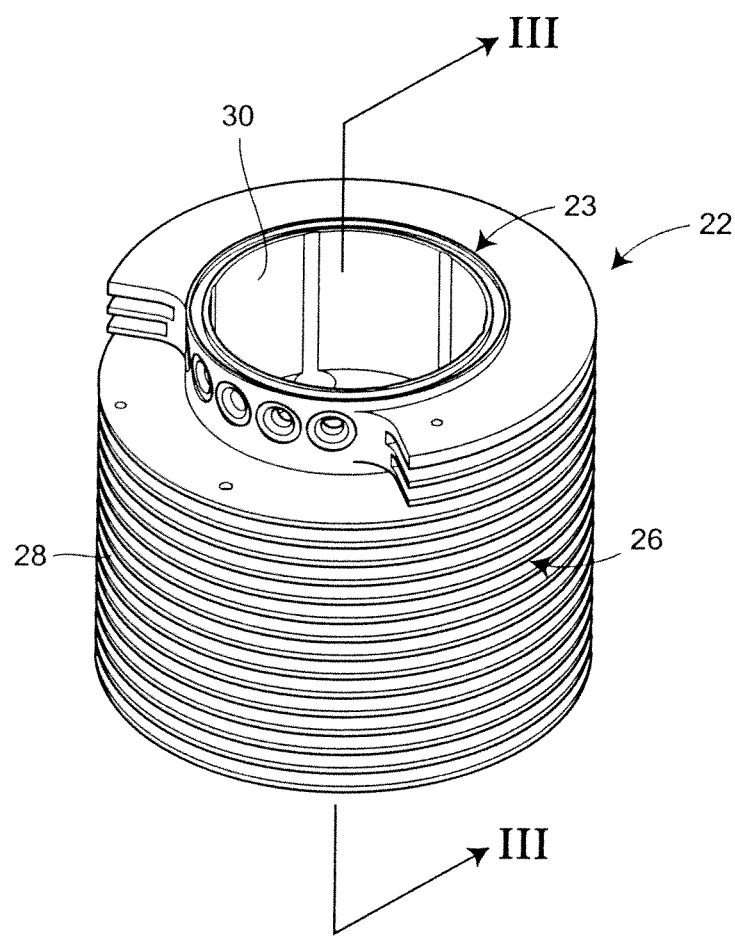
FIG. 2 is a perspective view of a motor housing of the centrifuge of FIG. 1, which constitutes a heat sink constructed in accordance with the principles of the present disclosure.

FIG. 1 depicts a centrifuge 10 constructed in accordance with the principles of the present disclosure including a rotor 12, a rotary shaft 14, and a motor 16 for spinning the shaft 14 and rotor 12 in a conventional manner. Additionally, the centrifuge 10 depicted in FIG. 1 includes a damper 18 through which the shaft 14 extends from the motor 16 to the rotor 12. When the centrifuge 10 is operating at its critical speed, the damper 18 actuates as is conventionally understood. The motor 16 can include a variable speed electric motor including a stator and winding coil arrangement 20 disposed within a motor housing 22, for example, as is generally understood within the art. Moreover, as illustrated, the motor 16 is disposed within a cooling shroud 24. During use, air can be introduced into the cooling shroud 24 with a fan or other bower, for example, to cool the motor 16. To facilitate this cooling, the motor housing 22 constitutes a heat sink 26 and includes a plurality of substantially parallel fins 28, which are designed to optimize the cooling performance of the motor 16, as well as abate sound generated due to vibrations inherent to the operation of the centrifuge 10.

Figure 3:
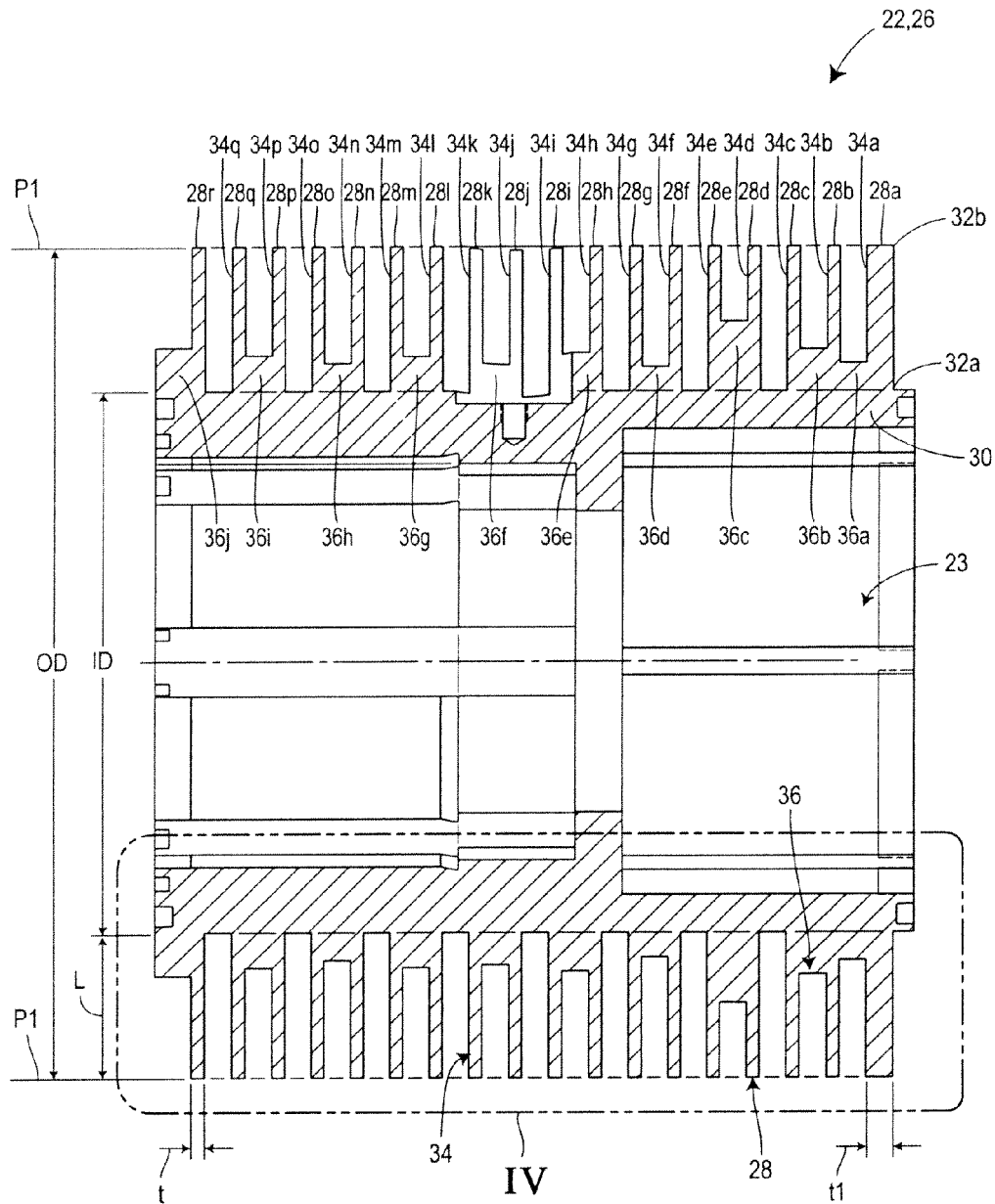
FIG. 3 is a cross-sectional view of the motor housing of FIG. 2 taken through line III-III of FIG. 2.
Figure 4:
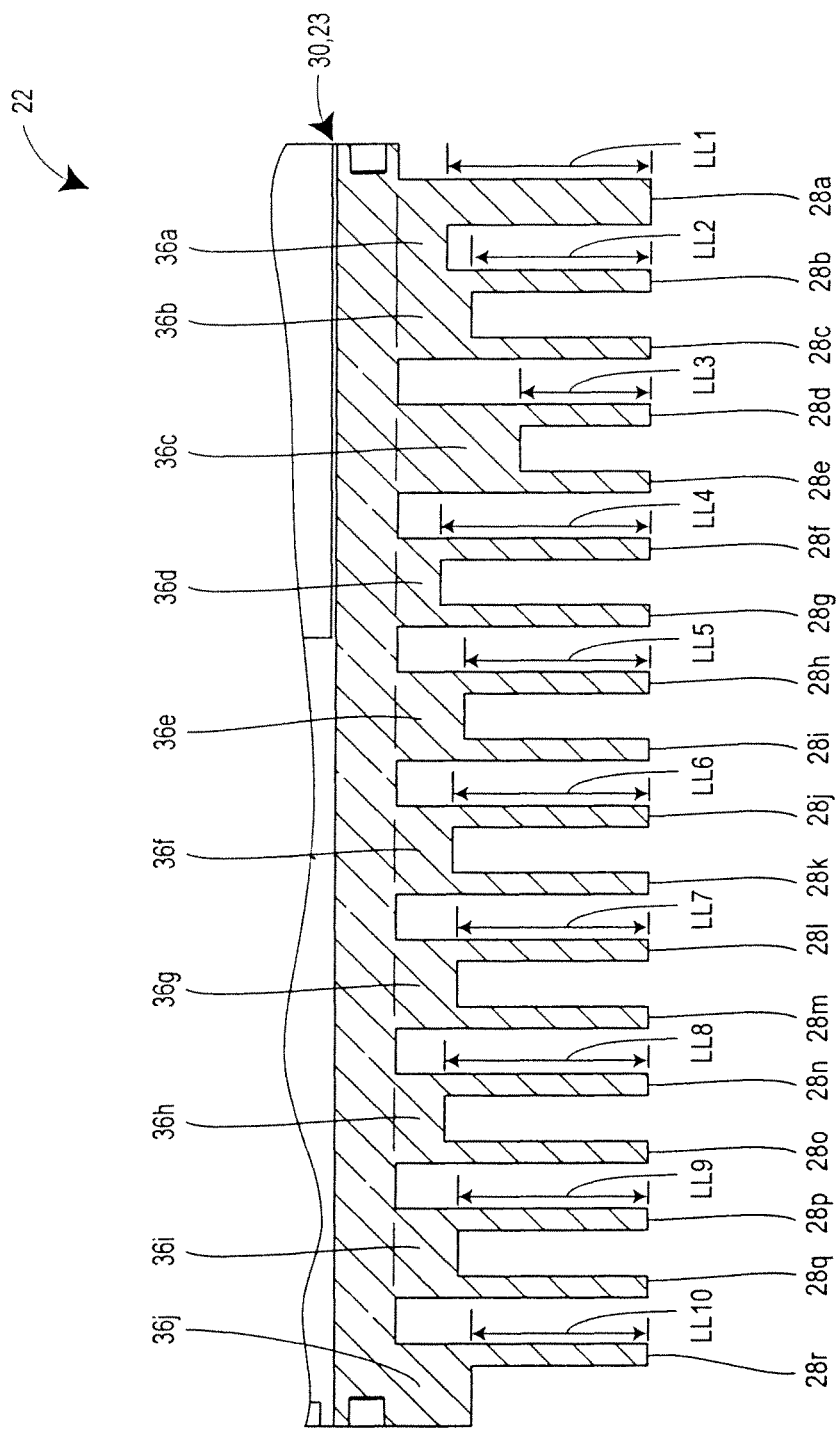
FIG. 4 is a detail view of the cross-sectional view of FIG. 3 taken from boundary IV of FIG. 3.

FIGS. 2-5 depict the motor housing 22 removed from the remainder of the centrifuge 10 of FIG. 1. As shown, the motor housing 22 is a one-piece structure and includes a generally hollow cylindrical base plate 23 having a cylindrical body portion 30 and the plurality of fins 28. As shown in FIGS. 3 and 4, the plurality of fins 28 includes first through eighteenth fins 28a-28r. The fins 28 are integral with the cylindrical body portion 30, i.e., the fins 28 and the cylindrical body portion 30 are formed from a single piece of material such as aluminum or generally any other material during a turning operation on a lathe, for example. In alternative embodiments, the motor housing 22 can have more or less than first through eighteenth fins 28a-28r.

The fins 28a-28r of the present embodiment are generally disc-shaped and extend radially outward from the cylindrical body portion 30. That is, each of the plurality of fins 28 includes a fixed end 32a at the cylindrical body portion 30 of the base plate 23 and a free end 32b spaced from the cylindrical body portion 30 of the base plate 23. For the sake of description, the disc-shaped fins 28 of the present embodiment include generally annular plates, similar to conventional washers. As such, each of the fins 28 includes an inner diameter ID at the fixed ends 32a and an outer diameter OD at the free ends 32b. In the disclosed embodiment, all of the fins 28a-28r have the same outer diameters OD such that the free ends 32b of all of the fins 28a-28r are disposed in a common plane P1, which in the present embodiment constitutes a cylindrical plane. Accordingly, the motor housing 22 of the present embodiment has an outer envelope that is cylindrical in shape and defined by the cylindrical plane P1.

Moreover, each of the plurality of fins 28a-28r has a fin thickness t, a true fin length L, and an effective fin length LL. The second through eighteenth fins 28b-28r have a common fin thickness t, and the first fin 28a has a thickness t1 that is larger than the thickness t of the second through eighteenth fins 28b-28r. Other embodiments may include fins that have consistent thicknesses or that vary in thickness in any number of ways, such as, for example, fins that increase in thickness from 1 to x, and then repeat the period of increasing thickness for fins x+1 to y and so on. The fins may also vary in thickness in other formulaic fashions or vary in a more random fashion.

In the present embodiment, because the fins 28 comprise generally disc-shaped fins, the true fin length L and the effective fin length LL can alternatively be characterized as a radial dimension and an effective radial dimension of the fins 28, respectively. The true fin length L is defined as the distance between the fixed and free ends 32a, 32b of the fins 28, and therefore, is equal to a distance between the outer diameter OD and inner diameter ID of the fins 28. In the present embodiment, each of the fins 28 share a common true fin length L. The effective fin length LL of each fin 28 can be characterized as the length of the portion of the fin 28 that is susceptible vibrating during operation of the centrifuge 10. In the present embodiment, at least some of the fins 28 have different effective fin lengths LL, as will be described.

Still referring to FIGS. 2-5, the motor housing 22 of the present embodiment further includes a plurality of substantially parallel grooves 34, and a plurality of protrusions 36. The plurality of grooves 34 are interleaved between the plurality of fins 28, i.e., each groove 34 is disposed between an adjacent pair of the plurality of fins 28. The plurality of protrusions 36 are integral with the cylindrical body portion 30 and the plurality of fins 28 of the motor housing 22, i.e., the protrusions 36, the body portion 30, and the fins 28 are farmed from a single piece of material. Moreover, the plurality of protrusions 36 extend between adjacent pairs of the plurality of fins 28. As such, adjacent pairs of the plurality of fins 28 share a common effective fin length LL, which for each fin 28 can be characterized as the distance between the free end 32b of the fin 28 and the protrusion 36 that is disposed between the fin 28 and its adjacent fin 28, as described in more detail below.

In the depicted embodiment, the plurality of grooves 34 includes first through seventeenth grooves 34a-34q and the plurality of protrusions 36 includes first through tenth protrusions 36a-36j. Each of the plurality of protrusions 36a-36j includes a generally disc-shaped member and extends from the cylindrical body portion 30 of the motor housing 22 adjacent to one of the plurality of grooves 34, except for the tenth protrusion 36j. The tenth protrusion 36j is disposed on an end of the motor housing 22 opposite the eighteenth fin 28r from first through seventeenth fins 28a-28q. Each of the plurality of grooves 34a-34q has a common groove width w, and a groove depth d1-d17 defined by a distance between the free ends 32b of the fins 28a-28r and either the cylindrical body portion 30 of the base plate 23 or one of the first through ninth protrusions 36a-36i of the base plate 23, as shown in FIG. 5 and discussed below.

Figure 5:
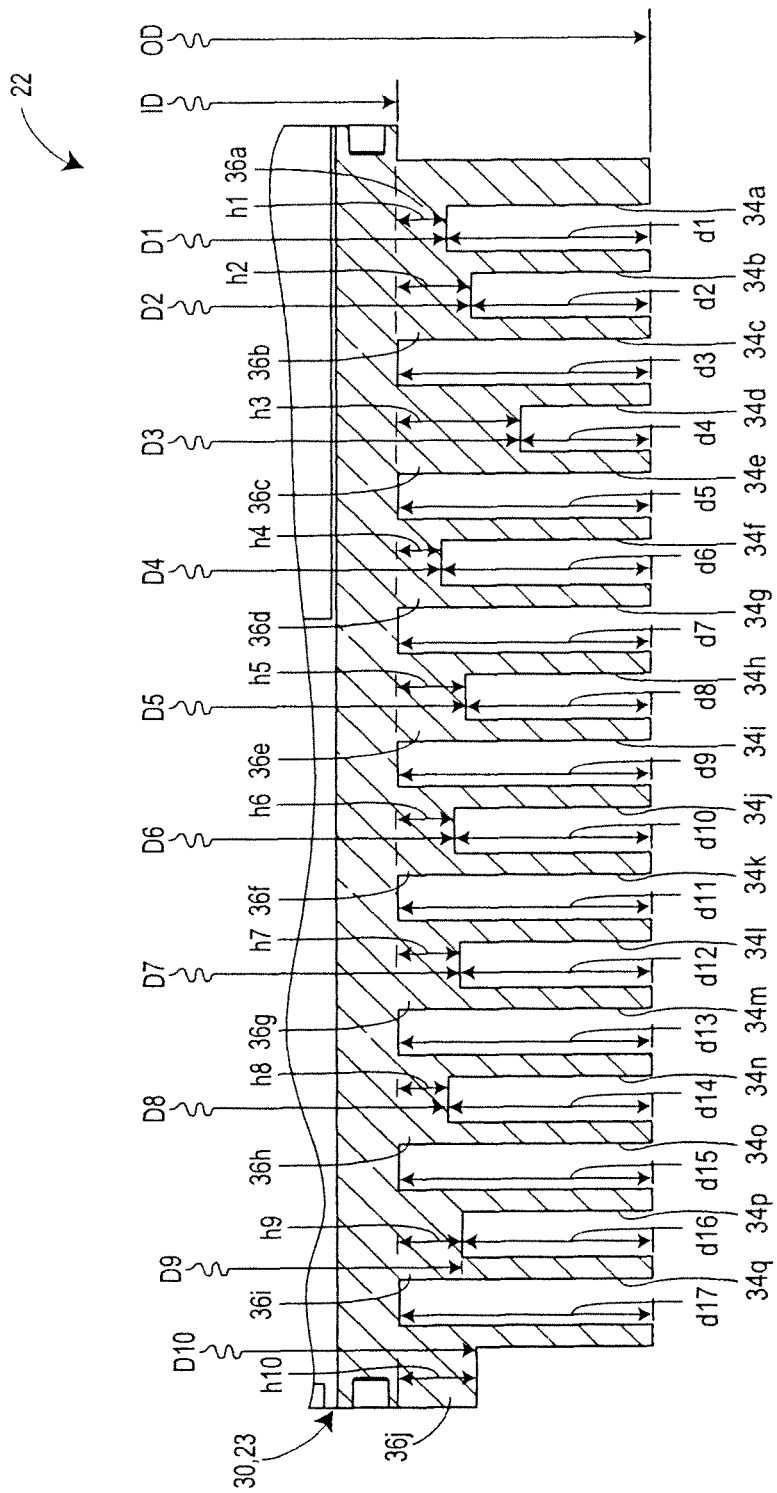
FIG. 5 is identical to FIG. 4, but includes additional dimensioning not included in FIG. 4.

For example, FIGS. 4 and 5 show that the first protrusion 36a extends between the first and second fins 28a, 28b and defines the groove depth d1 of the first groove 34a. The second protrusion 36b extends between the second and third fins 28b, 28c and defines the groove depth d2 of the second groove 34b, which is immediately adjacent the first groove 34a. The remaining third through ninth protrusions 36c-36i, however, are arranged such that they define the groove depths d of alternating grooves, i.e., every other groove 34, of the fourth to seventeenth grooves 34d-34i. Specifically, the third protrusion 36c extends between the fourth and fifth fins 28d, 28e and defines the groove depth d4 of the fourth groove 34d; the fourth protrusion 36d extends between the sixth and seventh fins 28f, 28g and defines the groove depth d6 of the sixth groove 34f; the fifth protrusion 36e extends between the eighth and ninth fins 28h, 28i and defines the groove depth d8 of the eighth groove 34h; the sixth protrusion 36f extends between the tenth and eleventh fins 28j, 28k and defines the groove depth d10 of the tenth groove 34j; the seventh protrusion 36g extends between the twelfth and thirteenth fins 28l, 28m and defines the groove depth d12 of the twelfth groove 34l; the eighth protrusion 36h extends between the fourteenth and fifteenth fins 28n, 28o and defines the groove depth d14 of the fourteenth groove 34n; and the ninth protrusion 36i extends between the sixteenth and seventeenth fins 28p, 28q and defines the groove depth d16 of the sixteenth groove 34p.

FIGS. 4 and 5 also show that the second and third fins 28b, 28c, which are separated by the second protrusion 36b, share a common effective fin length LL2. The fourth and fifth fins 28d, 28e, which are separated by the third protrusion 36c, share a common effective fin length LL3. The sixth and seventh fins 28f, 28g, which are separated by the fourth protrusion 36d, share a common effective fin length LL4. The eighth and ninth fins 28h, 28i, which are separated by the fifth protrusion 36e, share a common effective fin length LL5. The tenth and eleventh fins 28j, 28k, which are separated by the sixth protrusion 36f, share a common effective fin length LL6. The twelfth and thirteenth fins 28l, 28m, which are separated by the seventh protrusion 36g, share a common effective fin length LL7. The fourteenth and fifteenth fins 28n, 28o, which are separated by the eighth protrusion 36h, share a common effective fin length LL8. The sixteenth and seventeenth fins 28p, 28q, which are separated by the ninth protrusion 36i, share a common effective fin length LL9.

Furthermore, as shown in FIGS. 4 and 5, the protrusions 36a-36j of the present embodiment extend different distances away from the cylindrical body portion 30 of the motor housing 22. That is, the first through tenth protrusions 36a-36j include first through tenth protrusion heights h1-h10, which are defined by the distance each protrusion 36a-36j extends away from the cylindrical body portion 30 of the base plate 23 of the motor housing 22. Because the present embodiment of the heat sink 26 is generally cylindrical, and the protrusions 36 are generally disc-shaped, the protrusion heights h1-h10 can also be characterized as radial dimensions of the protrusions 36.

Each of the first through tenth protrusion heights h1-h10 of the present embodiment are distinct from the other protrusion heights h1-h10. So configured, each of the first, second, fourth, sixth, eighth, tenth, twelfth, fourteenth, and sixteenth grooves 34a, 34b, 34d, 34f, 34h, 34j, 34l, 34n, 34p have distinct groove depths d1, d2, d4, d6, d8, d10, d12, d14, d16, respectively. Each groove depth d1, d2, d4, d6, d8, d10, d12, d14, d16 is defined by the distance that each groove 34 extends between the free ends 32b and the fins 28a-28r and the corresponding one of the first through ninth protrusions 36a-36i. Because the motor housing 22 of the present embodiment does not include protrusions 36 adjacent to the remaining third, fifth, seventh, ninth, eleventh, thirteenth, and fifteenth grooves 34c, 34e, 34g, 34i, 34k, 34m, 34o, 34q, the third, fifth, seventh, ninth, eleventh, thirteenth, and fifteenth grooves 34c, 34e, 34g, 34i, 34k, 34m, 34o, 34q include groove depths d3, d5, d7, d9, d11, d13, and d15 that are generally identical and defined by the distance between the free ends 32b of the fins 28 and the cylindrical body portion 30 of the base plate 23 of the motor housing 22.

While the protrusions 36a-36j and grooves 34a-34q have thus far been described as including protrusion heights h1-h10 and groove depths d1-d18, respectively, these characteristics can also be described in terms of radial/diametrical dimensions because the heat sink 26 of the present embodiment, i.e., the motor housing 22, is cylindrical. Accordingly, the first through tenth protrusions 36a-36j can be described as including first through tenth protrusion diameters D1-D10 that are distinct from each other. Moreover, because the first through tenth protrusions 36a-36j define the depths d1, d2, d4, d6, d8, d10, d12, d14, and d16 of the first, second, fourth, sixth, eighth, tenth, twelfth, fourteenth, and sixteenth grooves 34a, 34b, 34d, 34f, 34h, 34j, 34l, 34n, 34p, respectively, the first, second, fourth, sixth, eighth, tenth, twelfth, fourteenth, and sixteenth grooves 34a, 34b, 34d, 34f, 34h, 34j, 34l, 34n, 34p can be described as having inner diameters that correspond directly to the corresponding first through tenth protrusion diameters D1-D10, and outer diameters equal to the outer diameter OD of the plurality of fins 28. Moreover, each of the remaining grooves 34c, 34e, 34g, 34i, 34k, 34m, 34o, 34q includes a common inner diameter that is equal to the inner diameter ID of the fins 28 because the motor housing 22 of the present embodiment does not include protrusions 36 adjacent thereto.

In view of the foregoing, the heat sink 26, i.e., the motor housing 22, of the presently disclosed embodiment includes a plurality of fins 28 separated by a plurality of grooves 34, wherein every other groove 34 has a common groove depth d measured between the free ends 32b of the fins 28 and the cylindrical body portion 30 of the base plate 23. The remaining grooves 34 have differing groove depths d that are dependent on the protrusion heights h of protrusions 36 extending from the cylindrical body portion 30 of the base plate 23 adjacent to the grooves 34.

This configuration of grooves 34 can be described as including a first multitude of grooves having a common groove depth and a second multitude of grooves having different groove depths, wherein the first and second multitude of grooves are interleaved to optimize cooling and sound abatement. For example, in the disclosed embodiment, the first multitude of grooves includes the third, fifth, seventh, ninth, eleventh, thirteenth, fifteenth, and seventeenth grooves 34c, 34e, 34g, 34i, 34k, 34m, 34o, and 34q, and the second multitude of grooves includes the second, fourth, sixth, eighth, tenth, twelfth, fourteenth, and sixteenth grooves 34b, 34d, 34f, 34h, 34j, 34l, 34n, and 34p. One benefit of this configuration is that the depth of each groove of the first multitude of grooves is greater than the depth of each groove of the second multitude of grooves. This configuration advantageously balances the ability to cool the heat sink 26 and abate sound. That is, the deeper first multitude of grooves maximizes cooling by increasing surface area adjacent to the base plate 23 and along the adjacent fins 28, and the shallower second multitude of grooves shortens the effective fin length of the adjacent fins, which varies their respective resonant frequencies to effectively abate unpleasant sounds.

More specifically, the fins 28 disposed on opposite sides of each protrusion 36 have common effective lengths LL, and therefore, generally identical mechanical properties, which leads to generally identical acoustical properties, e.g., resonant frequencies. However, because each of the protrusions 36 has a distinct protrusion height h, there are no more than two fins 28 on the motor housing 22 of the presently disclosed embodiment that will simultaneously vibrate at their respective resonant frequencies, which is a leading cause for unpleasant sounds created during operation of a conventional centrifuge. For example, as mentioned in the BACKGROUND section of the present disclosure, testing has illustrated that when the motor 16 of a conventional centrifuge accelerates and decelerates near a speed of approximately 83,000 RPM, an unpleasant high pitch whine is produced. This whine is also produced at steady state operation near 83,000 RPM, but with slightly less magnitude. The cause of this whine is the conventional motor housing used in the conventional centrifuge. That is, the conventional motor housing is equipped with a plurality of fins separated by a plurality of grooves for cooling the motor. Each of the fins are generally identical in length and thickness, and each of the grooves are generally identical in depth and width. So configured, each of the fins share a common effective length and resonant, fundamental, and/or harmonic frequency such that all of the fins resonate together and generate a high pitch whine.

In contrast to the conventional motor housing of the conventional centrifuge, the different groove depths d and protrusion heights h of the heat sink 26, e.g., the motor housing 22, of the present disclosure provides for fins 28 having different effective fin lengths LL such that no more than two fins 28 share a common resonant, fundamental, and/or harmonic frequency. This reduces the magnitude of the unpleasant sound generated by the fins 28 of the present disclosure below that generated by the conventional motor housing.

Figure 6:
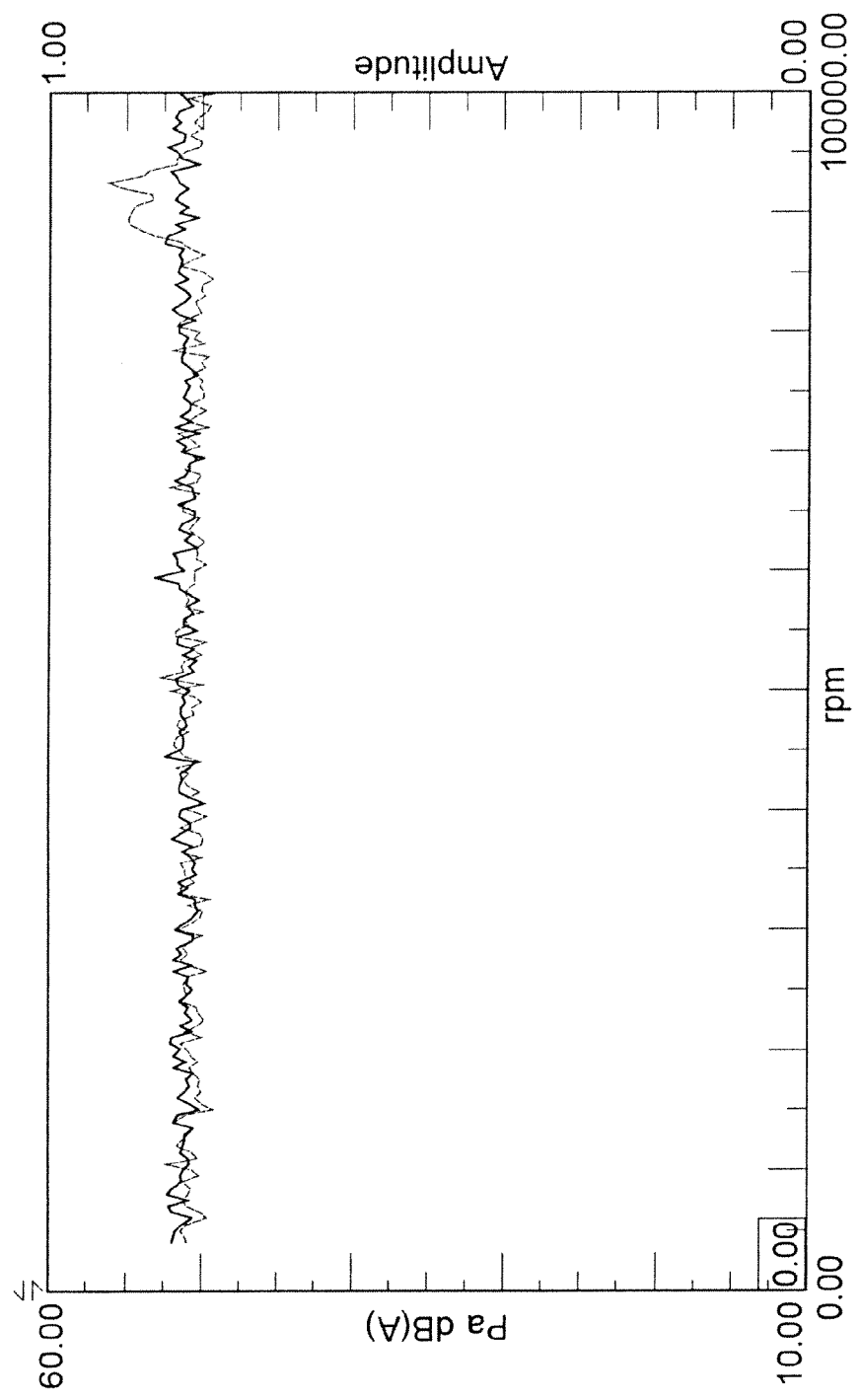
FIG. 6 is a graph comparing the sound levels generated by a conventional centrifuge motor housing and the centrifuge motor housing of the present disclosure.

FIG. 6 is a graph showing the sound levels generated by a conventional motor housing for a conventional centrifuge (thin dashed line) and sound levels generated by the motor housing 22 of the present disclosure (thick solid line) when the motor is operating between approximately 0 RPM and approximately 100,000 RPM. The graph illustrates that the conventional motor housing exhibits a significant increase in sound levels as the motor operates between approximately 80,000 RPM and approximately 90,000 RPM. In contrast, the graph illustrates that the motor housing 22 of the present disclosure does not exhibit any significant change in sound levels in this same range, but rather, maintains a generally constant sound level within acceptable tolerances.

In one preferred embodiment of the motor housing 22 described thus far, the inner diameter ID of the plurality of fins 28 is approximately 3.878" and the outer diameter OD of the plurality of fins is approximately 5.95". As such, the true length L of each of the plurality of fins 28, which also corresponds to the depths d3, d5, d7, d9, d11, d13, d15, and d17 of the third, fifth, seventh, ninth, eleventh, thirteenth, fifteenth, and seventeenth grooves 34c, 34e, 34g, 34i, 34k, 34m, 34o, and 34q, is approximately 1.036". Moreover, each of the second through eighteenth fins 28b-28r has a thickness t of approximately 0.090" and the first fin 28a has a thickness t1 of approximately 0.190". Further, each of the plurality of grooves 34 has a width w of approximately 0.190".

In the preferred embodiment, the protrusion diameter D1 of the first protrusion 36a is approximately 4.278", which defines a protrusion height h1 of approximately 0.2", a groove depth d1 of the first groove 34a as being equal to approximately 0.836", and an effective fin length LL1 of the first fin 28a as being equal to approximately 0.836". The diameter D2 of the second protrusion 36b is approximately 4.478", which defines a protrusion height h2 of approximately 0.3", a groove depth d2 of the second groove 34b as being equal to approximately 0.736", and an effective fin length LL2 of the second and third fins 28b, 28c as being equal to approximately 0.736". The diameter D3 of the third protrusion 36c is approximately 4.878", which defines a protrusion height h3 of approximately 0.5", a groove depth d4 of the fourth groove 34d as being equal to approximately 0.536", and an effective fin length LL3 of the fourth and fifth fins 28d, 28e as being equal to approximately 0.536". The diameter D4 of the fourth protrusion 36d is approximately 4.228", which defines a protrusion height h4 of approximately 0.175", a groove depth d6 of the sixth groove 34f as being equal to approximately 0.861", and an effective fin length LL4 of the sixth and seventh fins 28f, 28g as being equal to approximately 0.861". The diameter D5 of the fifth protrusion 36e is approximately 4.428", which defines a protrusion height h5 of approximately 0.275", a groove depth d8 of the eighth groove 34h as being equal to approximately 0.761", and an effective fin length LL5 of the eighth and ninth fins 28h, 28i as being equal to approximately 0.761". The diameter D6 of the sixth protrusion 36f is approximately 4.338", which defines a protrusion height h6 of approximately 0.23", a groove depth d10 of the tenth groove 34j as being equal to approximately 0.806", and an effective fin length LL6 of the tenth and eleventh fins 28j, 28k as being equal to approximately 0.806". The diameter D7 of the seventh protrusion 36g is approximately 4.378", which defines a protrusion height h7 of approximately 0.25", a groove depth d12 of the twelfth groove 34l as being equal to approximately 0.786", and an effective fin length LL7 of the twelfth and thirteenth fins 28l, 28m as being equal to approximately 0.786". The diameter D8 of the eighth protrusion 36h is approximately 4.278", which defines a protrusion height h8 of approximately 0.2", a groove depth d14 of the fourteenth groove 34n as being equal to approximately 0.836", and an effective fin length LL8 of the fourteenth and fifteenth fins 28n, 28o as being equal to approximately 0.836". The diameter D9 of the ninth protrusion 36i is approximately 4.388", which defines a protrusion height h9 of approximately 0.255", a groove depth d16 of the sixteenth groove 34p as being equal to approximately 0.781", and an effective fin length LL9 of the sixteenth and seventeenth fins 28p, 28q as being equal to approximately 0.781". Finally, the diameter D10 of the tenth protrusion 36j is approximately 4.5", which defines a protrusion height h10 of approximately 0.311" and an effective length LL10 of the eighteenth fin 28r as being equal to approximately 0.725".

Thus, from the foregoing, the heat sink 26, i.e., the motor housing 22, of the presently disclosed embodiment can be described as having a plurality of grooves 34, each having a groove depth d in the range of approximately 0.536" to approximately 0.861" when a protrusion 36 is present, and a depth of approximately 1.036" when no protrusion 36 is present. Moreover, the fins 28 of the present embodiment can be described as having effective lengths LL in the range of approximately 0.536" to approximately 0.861". Further still, the protrusions 36 of the present embodiment can be described as having protrusion heights h in the range of approximately 0.175" to approximately 0.5" and protrusion diameters D in the range of approximately 4.228" to approximately 4.878". These specific dimensions and ranges set forth herein are merely an example, and other dimensions and ranges can foreseeably be used to obtain a suitable heat sink in accordance with the principles of the present disclosure.

Furthermore, from the foregoing, the protrusion diameters D1-D10 and protrusion heights h1-h10 of the presently disclosed embodiment of the heat sink 26 can be described as being randomly selected, wherein the primary characteristic of the protrusions 36 is that at least some of the protrusion diameters D1-D10 and protrusion heights h1-h10 are different from the others such that at least some of the fins 28 have different effective fin lengths LL, and therefore, different mechanical and acoustical properties. In alternative embodiments, the protrusion diameters D1-D1 and protrusion heights h1-h10 need not be random, but rather, could be determined in accordance with some mathematical relationship, equation, and/or function, for example. Other embodiments may include effective fin lengths that are configured in an irregular pattern.

Figure 7:
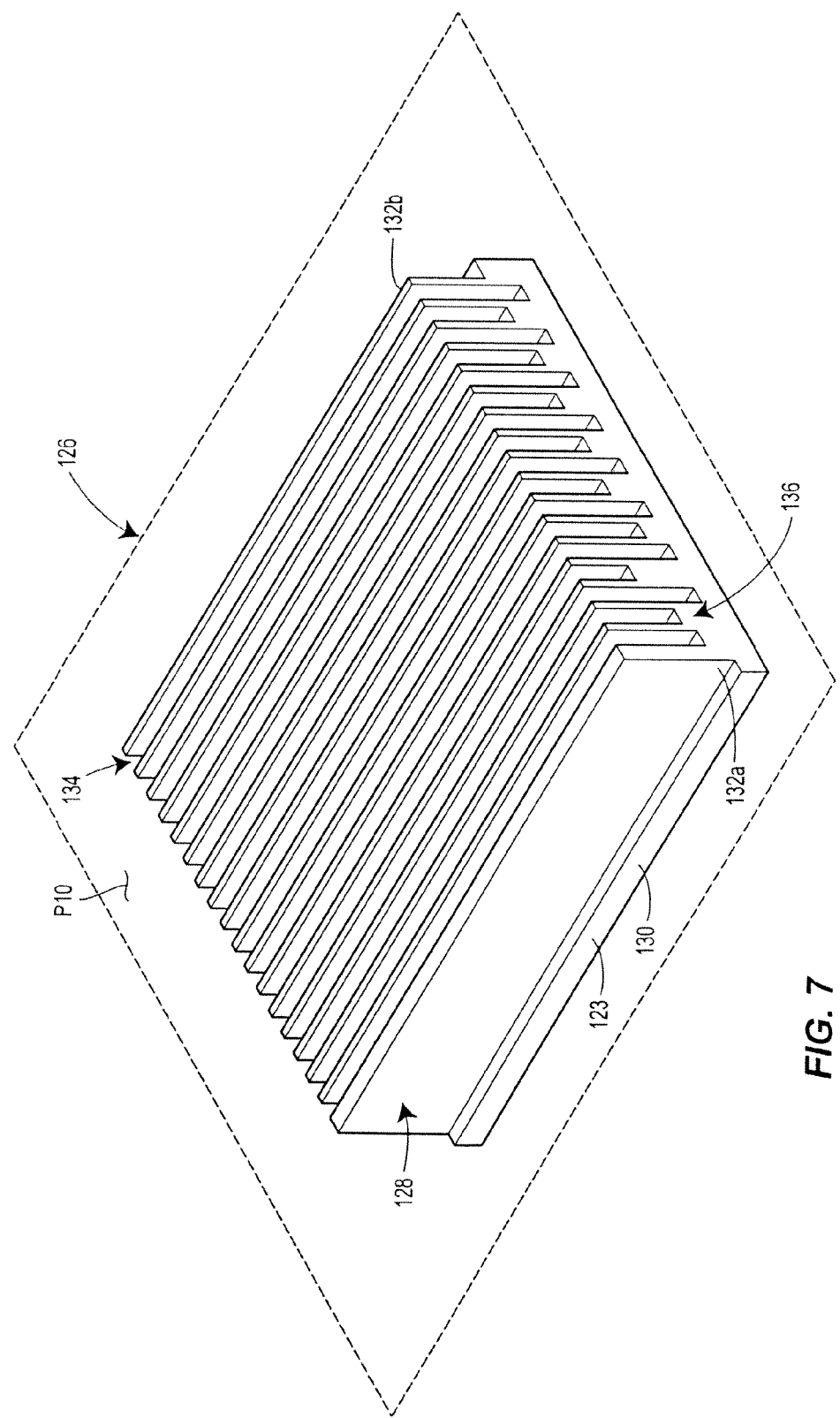
FIG. 7 is a perspective view of a heat sink constructed in accordance with an alternative embodiment of the present disclosure.

While the present disclosure has thus far focused on a heat sink 26 in the form of a cylindrical motor housing 22, the principles disclosed herein can equally apply to heat sinks having different geometries. For example, FIG. 7 depicts a heat sink 126 constructed in accordance with the principles of the present disclosure and having a substantially flat geometry. Such a flat heat sink 126 can be used for cooling various types of electronic devices such as semiconductors, transistors, diodes, or any other device desiring and/or requiring cooling. Other than being substantially flat, the heat sink 126 depicted in FIG. 7 can be identical to the heat sink 26 described above with reference to FIGS. 1-5, including the various alternative variations described above.

The heat sink 126 includes a base plate 123 having a body portion 130, a plurality of fins 128, a plurality of grooves 134, and a plurality of protrusions 136. The body portion 130 comprises a substantially flat plate portion of the heat sink 126. The plurality of fins 128 and plurality of protrusions 136 are integral with the flat body portion 130, i.e., the flat body portion 130, the plurality of fins 128, and the plurality of protrusions 136 are constructed from a single piece of material such as aluminum through a milling operation, for example.

The plurality of fins 128 are generally rectangular in shape and include fixed ends 132a at the body portion 130 of the base plate 132 and free ends 132b spaced from the body portion 130 of the base plate 132. In the disclosed embodiment, the free ends 132b of the plurality of fins 128 are disposed in a common plane P10. In FIG. 6, the plane P10 is a substantially flat, two-dimensional plane. The plurality of grooves 134 are interleaved between the plurality of fins 128 in a manner identical to the grooves 34 and fins 28 of the heat sink 26 described above with reference to FIGS. 1-4. Moreover, the plurality of protrusions 136 of the heat sink 126 extend away from the flat body portion 130 between pairs of adjacent fins 128 in a manner identical to the protrusions 36 of the heat sink 26 described above with reference to FIGS. 1-4. Each of the plurality of protrusions 136 of this embodiment can be arranged, designed, dimensioned, and configured identical to the protrusions 36 described above, or otherwise such that at least some of the fins 128 of the plurality of fins 128 have different effective fin lengths. That is, the protrusions 136 of the heat sink 126 in FIG. 7 can have the same protrusion, heights h1-h10 described above, or may have other protrusion heights that are either randomly selected, have an irregular pattern, or determined through a mathematical relationship, equation, function, or otherwise.

So configured, the heat sink 126 can provide the same advantages as the heat sink 26 described above. Specifically, the heat sink 26 can effectively disperse heat as well as abate sound by ensuring that at least some of the fins 128 have different effective fin lengths, and therefore, different resonant frequencies.

In view of the foregoing, it should be appreciated that the present disclosure is not limited to a heat sink of any general geometry, but rather, can include cylindrical heat sinks, flat heat sinks, or generally any other shape heat sink.

Moreover, while the protrusions of the variously disclosed heat sinks have been described as being disposed between alternating pairs of fins, alternative embodiments could have protrusions disposed between every third pair of fins, every fourth pair of fins, or generally any other configuration that is suitable for the intended purposes of cooling and abating sound.

While one advantage of the heat sinks described herein is that they provide effective sound abatement and cooling, another advantage of at least the cylindrical heat sink 26 described above with respect to FIGS. 1-4 is that the outer envelope of the heat sink 26, i.e., the motor housing 22, is a cylinder. This cylindrical shape is generally identical to a conventional motor housing for a centrifuge in both dimension and configuration, and therefore, no other aspect of the centrifuge must be redesigned to accommodate the heat sink 26, i.e., motor housing 22. For example, as discussed above with reference to FIG. 1, the motor housing 22 is accommodated within a cooling shroud 24, which is shaped as a cylinder. By maintaining the outer envelope of the motor housing 22 the same as the outer envelope of the conventional motor housing, the size and shape of the cooling shroud 24 does not have to be changed.

A yet further advantage of the disclosed heat sinks 26, 126 is that they are easily manufactured. For example, the cylindrical heat sink 26, i.e., the motor housing 22, described with reference to FIGS. 1-4 can easily be machined from a cylindrical stock of material on a lathe, for example. The cylindrical stock can be turned on the lathe to precisely machine the outer diameter OD of the fins 28, and the grooves 34 at their different groove depths d. Alternatively, the heat sink 126 described above with reference to FIG. 7 can easily be manufactured on a traditional milling machine from a standard stock of cube-shaped material. The stock can be secured into the milling machine and precisely milled to the desired outer dimensions, and the grooves 134 can be milled by passing an appropriate ling tool through the stock material at different depths to define the different depths of the grooves 134.

Accordingly, in view of the foregoing, it should be appreciated that the present disclosure provides a novel and inventive heat sink, motor housing, and centrifuge that is capable of effectively cooling a subject device while simultaneously desirably abating unpleasant sounds.

The present disclosure is not intended to be limited to the specific embodiments described herein, but rather, is intended to include all variations, modifications, and alternatives that would be understood by a person having ordinary skill in the art.

As such, the present disclosure can be generally defined as including the following "aspects."

Aspect 1. A centrifuge, comprising:
a rotor configured to receive sample containers;
a drive shaft operatively coupled to the rotor; and
a motor operatively coupled to the drive shaft to rotate the drive shaft and the rotor during a centrifugal operation, wherein the motor comprises:
  (i) a housing;
  (ii) a plurality of substantially parallel fins integral with the housing, each fin having a free end spaced from the housing, wherein the free ends of the plurality of fins are disposed in a common cylindrical plane; and
  (iii) a plurality of substantially parallel grooves, each groove disposed between a pair of adjacent fins and having a groove depth defined by a distance between the common cylindrical plane and the housing,
wherein the plurality of grooves comprises a first multitude of grooves having a common groove depth and a second multitude of grooves having a groove depth that is not the same as the common groove depth, wherein the first and second multitude of grooves are interleaved.

Aspect 2. The centrifuge of aspect 1, wherein at least two of the second multitude of grooves have a different groove depth.

Aspect 3. The centrifuge of any one of the preceding aspects, wherein each of the second multitude of grooves have a different groove depth.

Aspect 4. The centrifuge of any one of the preceding aspects, wherein every other groove has the common groove depth.

Aspect 5. The centrifuge of any one of the preceding aspects, wherein the common groove depth is greater than the groove depth of each of the second multitude of grooves.

Aspect 6. A centrifuge, comprising:
a rotor configured to receive sample containers;
a drive shaft operatively coupled to the rotor; and
a motor operatively coupled to the drive shaft to rotate the drive shaft and the rotor during a centrifugal operation, wherein the motor comprises:
  (i) a housing;
  (ii) a plurality of substantially parallel fins integral with the housing, each fin having a free end spaced from the housing, wherein the free ends of the plurality of fins are disposed in a common cylindrical plane; and
  (iii) a plurality of substantially parallel grooves, each groove disposed between a pair of adjacent fins and having a groove depth defined by a distance between the common cylindrical plane and the housing,
wherein each groove has a groove depth that is different than the groove depth of an adjacent groove.

Aspect 6. A centrifuge, comprising:
a rotor configured to receive sample containers;
a drive shaft operatively coupled to the rotor; and
a motor operatively coupled to the drive shaft to rotate the drive shaft and the rotor during a centrifugal operation, wherein the motor comprises:
  (i) a housing;
  (ii) a plurality of substantially parallel fins integral with the housing, each fin having a free end spaced from the housing, wherein the free ends of the plurality of fins are disposed in a common cylindrical plane; and
  (iii) a plurality of substantially parallel grooves, each groove disposed between a pair of adjacent fins and having a groove depth defined by a distance between the common cylindrical plane and the housing,
wherein each groove has a groove depth that is different than the groove depth of an adjacent groove.

Aspect 7. The centrifuge of aspect 6, wherein the groove depth of at least three of the plurality of grooves are different.

Aspect 8. The centrifuge of aspect 6 or 7, wherein the depth of the different groove depths are randomly selected.

Aspect 9. The centrifuge of aspects 6 to 8, wherein at least two of the groove depths are the same.

Aspect 10. The centrifuge of aspects 6 to 9, wherein at least two of the groove depths are different, wherein the grooves having the same groove depth and the grooves having different groove depths are interleaved.

Aspect 11. The centrifuge of aspects 9 to 10, wherein the grooves having the same groove depth are every other groove.

Aspect 12. The centrifuge of aspects 6 to 11, wherein each of the plurality of fins has a fin thickness and wherein at least two of the fins have a fin thickness that is not the same.

Aspect 13. A centrifuge, comprising:
a rotor configured to receive sample containers;
a drive shaft operatively coupled to the rotor; and
a motor operatively coupled to the drive shaft to rotate the drive shaft and the rotor during a centrifugal operation, wherein the motor comprises a housing and a plurality of substantially parallel fins extending from the housing,
wherein the housing comprises a body portion and a plurality of protrusions integral with the body portion, the plurality of protrusions disposed between pairs of adjacent fins, each protrusion having a radial dimension defined by a distance that the protrusion extends away from the body portion,
wherein each protrusion has a radial dimension that is not the same as the radial dimension of an adjacent protrusion.

Aspect 14. The centrifuge of aspect 13, wherein each of the plurality of protrusions has a different radial dimension.

Aspect 15. The centrifuge of aspect 14, wherein protrusions of different radial dimension are randomly distributed along the housing.

Aspect 16. The centrifuge of aspects 13 to 15, wherein the plurality of protrusions are disposed in a regular period between pairs of adjacent fins.

Aspect 17. The centrifuge of aspects 13 to 16, wherein the plurality of protrusions are disposed between every other pair of adjacent fins.

Aspect 18. The centrifuge of aspects 13 to 17, wherein each of the plurality of fins has a free end spaced from the housing, wherein the free ends of the plurality of fins are disposed in a common cylindrical plane.

Aspect 19. The centrifuge of aspects 13 to 18, wherein the plurality of protrusions comprises a first, second, and third consecutive protrusion, wherein the second consecutive protrusion is between the first and third consecutive protrusions, wherein the radial dimension of the second consecutive protrusion is greater than the radial dimensions of the first and third consecutive protrusions.

Aspect 20. The centrifuge of aspects 13 to 19, wherein the plurality of protrusions comprises a first, second, and third consecutive protrusion, wherein the second consecutive protrusion is between the first and third consecutive protrusions, wherein the radial dimension of the second consecutive protrusion is less than the radial dimensions of the first and third consecutive protrusions.

Aspect 21. The centrifuge of any one of the preceding aspects, wherein the common groove depth is greater than the smallest groove depth of the second multitude of grooves.

Aspect 22. The centrifuge of any one of the preceding aspects, wherein the first multitude of grooves provide for increased surface area to maximize cooling and the second multitude of grooves provide for reduced effective fin lengths of the adjacent fins to abate sound.

Aspect 23. The centrifuge of any one of the preceding aspects, wherein each of the plurality of fins comprises a generally disc-shaped fin.

Aspect 24. The centrifuge of any one of the preceding aspects, wherein each of the plurality of fins has a free end spaced from the housing and an effective fin length defined by a distance between the free end of the fin and the protrusion between the fin and an adjacent fin, the effective fin length characterizing the portion of the fin that is susceptible to vibration during operation of the centrifuge, wherein no more than two of the plurality of fins have the same effective fin length.

Aspect 25. The centrifuge of any one of the preceding aspects, wherein the housing is a cylindrical housing.

Aspect 26. The centrifuge of any one of aspects 13 to 20, wherein the plurality of protrusions include: a first protrusion disposed between a first and a second adjacent fin, and a second consecutive protrusion disposed between a third and a fourth adjacent fin.

Aspect 27. The centrifuge of any one of the preceding aspects, wherein at least some of the plurality of fins share a common fin thickness and at least some of the plurality of grooves share a common groove width.

Aspect 28. The centrifuge of any one of the preceding aspects, wherein each of the plurality of fins comprises a generally rectangular fin.

Aspect 29. The centrifuge of any one of the preceding aspects, wherein the plurality of fins share a common outside diameter.

Aspect 30. The centrifuge of any one of the preceding aspects, wherein the common groove depth is approximately 1.036 inches and each groove depth of the different groove depths is in the range of approximately 0.536 inches to approximately 0.861 inches.

Aspect 31. The centrifuge of any one of the preceding aspects, wherein the first multitude of grooves provide for increased surface area to maximize cooling and the second multitude of grooves provide for reduced effective fin lengths of the adjacent fins to abate sound.

Aspect 32. The centrifuge of any one of the preceding aspects, wherein the motor operates at a speed in a range of approximately 0 RPM and approximately 100,000 RPM.

Aspect 33. The centrifuge of any one of the preceding aspects, wherein the effective fin length of each fin is in the range of approximately 0.536 inches to approximately 0.861 inches.

Aspect 34. The centrifuge of aspects 13 to 20, wherein the protrusion height of each of the plurality of protrusions is in the range of approximately 0.175 inches to approximately 0.5 inches.

Aspect 35. The centrifuge of aspects 13 to 20, wherein each of the protrusions has a protrusion diameter in the range of approximately 4.228 inches to approximately 4.878 inches.

I claim:

1. A centrifuge, comprising:
    a rotor configured to receive sample containers;
    a drive shaft operatively coupled to the rotor; and
    a motor operatively coupled to the drive shaft to rotate the drive shaft and the rotor during a centrifugal operation, herein the motor comprises:
        (i) a housing;
        (ii) a plurality of substantially parallel fins integral with the housing, each fin having a free end spaced from the housing, wherein the free ends of the plurality of fins are disposed in a common cylindrical plane; and
        (iii) a plurality of substantially parallel grooves, each groove disposed between a pair of adjacent fins and having a groove depth defined by a distance between the common cylindrical plane and the housing,
    wherein the plurality of grooves comprises a first multitude of grooves having a common groove depth and a second multitude of grooves having a groove depth that is not the same as the common groove depth and each of the second multitude of grooves has a different groove depth from each other, wherein the first and second multitude of grooves are interleaved.

2. The centrifuge of claim 1, wherein the first multitude of grooves comprises every other groove has the common groove depth.

3. The centrifuge of claim 1, wherein the common groove depth is greater than the groove depth of each of the second multitude of grooves.

4. A centrifuge, comprising:
    a rotor configured to receive sample containers;
    a drive shaft operatively coupled to the rotor; and
    a motor operatively coupled to the drive shaft to rotate the drive shaft and the rotor during a centrifugal operation, wherein the motor comprises:
        (i) a housing;
        (ii) a plurality of substantially parallel fins integral with the housing, each fin having a free end spaced from the housing, wherein the free ends of the plurality of fins are disposed in a common cylindrical plane; and
        (iii) a plurality of substantially parallel grooves, each groove disposed between a pair of adjacent fins and having a groove depth defined by a distance between the common cylindrical plane and the housing,
    wherein each groove has a groove depth that is different than the groove depth of an adjacent groove, wherein the plurality of grooves comprises a first multitude of grooves having a common groove depth and a second multitude of grooves having a groove depth that is not the same as the common groove depth and each of the second multitude of grooves has a different groove depth.

5. The centrifuge of claim 4, wherein the groove depth of at least three of the plurality of grooves are different from each other.

6. The centrifuge of claim 4, wherein at least three of the groove depths are the same.

7. The centrifuge of claim 4, wherein the first and second multitude of grooves are interleaved.

8. The centrifuge of claim 7, wherein the grooves having the common groove depth are every other groove.

9. The centrifuge of claim 4, wherein each of the plurality of fins has a fin thickness and wherein at least two of the fins have a fin thickness that is not the same.

10. A centrifuge, comprising:
    a rotor configured to receive sample containers;
    a drive shaft operatively coupled to the rotor; and
    a motor operatively coupled to the drive shaft to rotate the drive shaft and the rotor during a centrifugal operation, wherein the motor comprises a housing and a plurality of substantially parallel fins extending from the housing, wherein the housing comprises a body portion and a plurality of protrusions integral with the body portion, the plurality of protrusions disposed between pairs of adjacent fins, each protrusion having a radial dimension defined by a distance that the protrusion extends away from the body portion, wherein each of the plurality of protrusions has a different radial dimension that is not the same as the radial dimension of an adjacent protrusion.

11. The centrifuge of claim 10, wherein the plurality of protrusions are disposed in a regular period between pairs of adjacent fins.

12. The centrifuge of claim 11, wherein the plurality of protrusions are disposed between every other pair of adjacent fins.

13. The centrifuge of claim 10, wherein each of the plurality of fins has a free end spaced from the housing, wherein the free ends of the plurality of fins are disposed in a common cylindrical plane.

14. The centrifuge of claim 10, wherein the plurality of protrusions comprises a first, second, and third consecutive protrusion, wherein the second consecutive protrusion is between the first and third consecutive protrusions, wherein the radial dimension of the second consecutive protrusion is greater than the radial dimensions of the first and third consecutive protrusions.

15. The centrifuge of claim 10, wherein the plurality of protrusions comprises a first, second, and third consecutive protrusion, wherein the second consecutive protrusion is between the first and third consecutive protrusions, wherein the radial dimension of the second consecutive protrusion is less than the radial dimensions of the first and third consecutive protrusions.

* * * * *